United States Patent
Lau et al.

(10) Patent No.: US 10,015,664 B2
(45) Date of Patent: Jul. 3, 2018

(54) SERVICE ROUTING OPTIMIZATION

(71) Applicant: Verizon Patent and Licensing Inc., Arlington, VA (US)

(72) Inventors: Priscilla Lau, Fremont, CA (US); Ye Huang, San Ramon, CA (US); Wing-Cheong V. Yeung, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 19 days.

(21) Appl. No.: 14/295,984

(22) Filed: Jun. 4, 2014

(65) Prior Publication Data
US 2015/0358809 A1 Dec. 10, 2015

(51) Int. Cl.
| H04M 11/00 | (2006.01) |
| H04W 8/22 | (2009.01) |
| H04M 7/00 | (2006.01) |
| H04L 29/06 | (2006.01) |
| H04W 4/18 | (2009.01) |

(52) U.S. Cl.
CPC ............ H04W 8/22 (2013.01); H04L 65/1069 (2013.01); H04M 7/0072 (2013.01); H04W 4/18 (2013.01)

(58) Field of Classification Search
USPC .................... 709/228; 455/436, 432.2, 432.3
See application file for complete search history.

(56) References Cited

U.S. PATENT DOCUMENTS

| 6,385,195 | B2 * | 5/2002 | Sicher | H04L 12/2856 370/328 |
| 8,275,098 | B2 * | 9/2012 | Dudley | H04L 12/5895 370/389 |
| 2007/0281691 | A1 * | 12/2007 | Svensson | H04W 8/265 455/435.1 |
| 2008/0317065 | A1 * | 12/2008 | Chen | H04M 7/0072 370/469 |
| 2009/0006533 | A1 * | 1/2009 | Guo | H04L 65/1046 709/203 |
| 2014/0226529 | A1 * | 8/2014 | Harris | H04L 67/303 370/255 |
| 2015/0023160 | A1 * | 1/2015 | Alisawi | H04L 47/32 370/230 |

* cited by examiner

*Primary Examiner* — Vladimir Magloire
*Assistant Examiner* — Majid Syed

(57) ABSTRACT

A system may be configured to establish a communication between a first user device and a second user device, where the first and second user devices are associated with different service providers that provide different networks with which the first and second user devices are respectively associated. The establishing may include determining capability information, associated with the second user device, without requesting the capability information from the telecommunications network with which the second user device is associated. The establishing may further include transcoding the communication based on the capability information associated with the second user device.

20 Claims, 12 Drawing Sheets

SERVICE ROUTING OPTIMIZATION

BACKGROUND

Networks, such as wireless telecommunications networks, often provide services to users, such as voice services, chat services, video conferencing services, or the like. Different users and/or user devices may have different capabilities for handling different services. For example, a caller may attempt to place a video call to a callee who does not have the capability to receive a video call (e.g., the callee's device may not have a video calling application, the callee's device may not have a screen, the callee may not have a subscription to an associated video call service, etc.). In situations where callers and callees are on different networks (e.g., different wireless telecommunications networks associated with different service providers (or "carriers")), excessive time may be expended in determining whether a callee can support a requested communication.

DETAILED DESCRIPTION OF PREFERRED EMBODIMENTS

The following detailed description refers to the accompanying drawings. The same reference numbers in different drawings may identify the same or similar elements.

Figure 1:
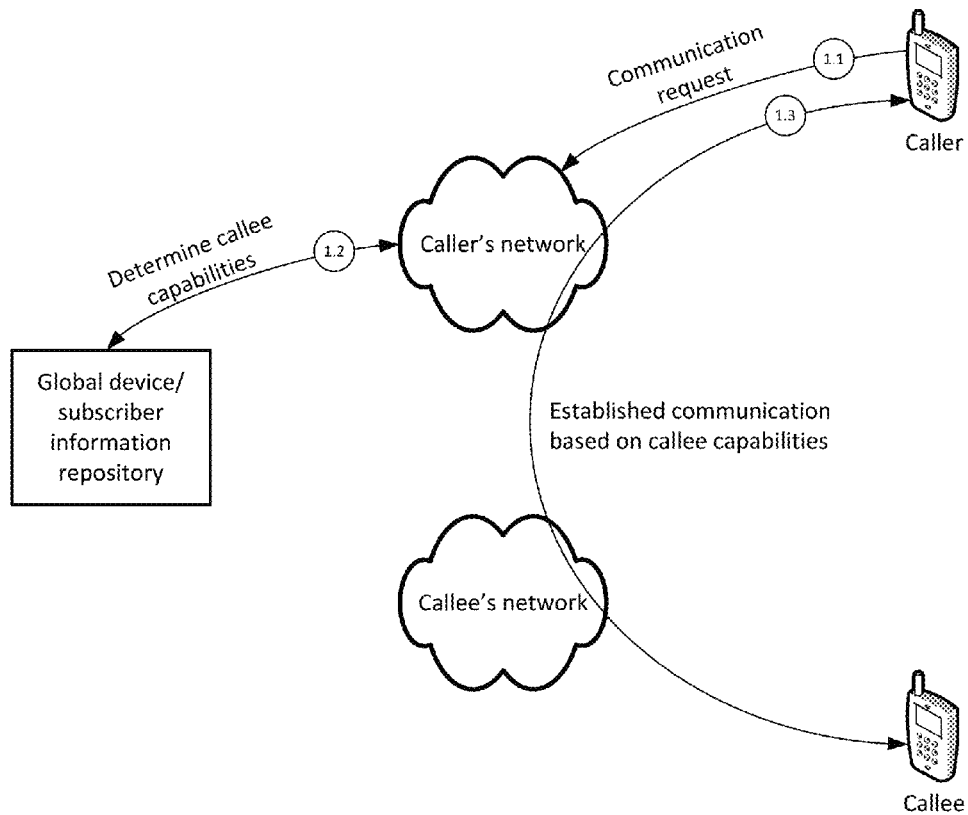
FIG. 1 illustrates an overview of one or more example implementations described herein.

Techniques described herein may allow for efficient communications, of various types, to be initiated between user devices (e.g., wireless telephones, tablet devices, etc.). The user devices may, in some situations, be associated with different service providers (sometimes referred to as "carriers"). For example, as shown in FIG. 1, a caller may request (at arrow "1.1") that a communication be initiated. The requested communication may be, for example, video conference, a chat session, a voice call, and/or another type of communication. Assume that the caller is associated with a first network ("Caller's network"), provided by a first service provider, while the callee is associated with a second network ("Callee's network"), provided by a second service provider.

In accordance with some implementations, the caller's network (e.g., a device associated with the caller's network, as described below) may request (at arrow "1.2") capability information, regarding the callee, from a global device/subscriber information repository ("GDSIR"). The GDSIR may store information regarding subscribers and/or user devices associated with multiple different carriers, so that callers' networks can quickly determine whether callees are able to support requested communications. For example, as described below, the GDSIR may store subscriber information (e.g., subscription information regarding subscribers, such as whether a subscriber is subscribed to a service whereby a particular type of communication is supported) and/or device capability information (e.g., information regarding user devices, such as display screen size, display screen resolution, codecs supported, etc.). The GDSIR may receive subscriber and/or device information, regarding a particular user device, from a network with which the user device is associated. For example, the GDSIR may receive the information when the user device is newly provisioned (e.g., when the user device is activated for the first time, when a telephone number is assigned to the user device, etc.).

In some implementations, networks (such as the caller's network) may maintain a local cached copy of some or all of the information provided by the GDSIR. The local cached copy may provide for an even faster determination of whether a callee (e.g., a callee associated with a different service provider) can support a requested communication.

In accordance with some implementations, the callee's network may make a determination as to whether the callee can support the communication, based on the call capabilities (determined at arrow "1.2"). The caller's network may facilitate (at arrow "1.3") an established communication, based on the callee capabilities. For example, in some situations, and as described in more detail below, the caller's network may route the communication through an interworking function ("IWF") when determining that the callee cannot ordinarily support the communication. For example, in situations where a codec, associated with the requested communication, is not supported by the callee, the IWF may transcode the communication, from the caller, to a codec supported by the callee, before routing the communication to the callee's network.

Figure 2:
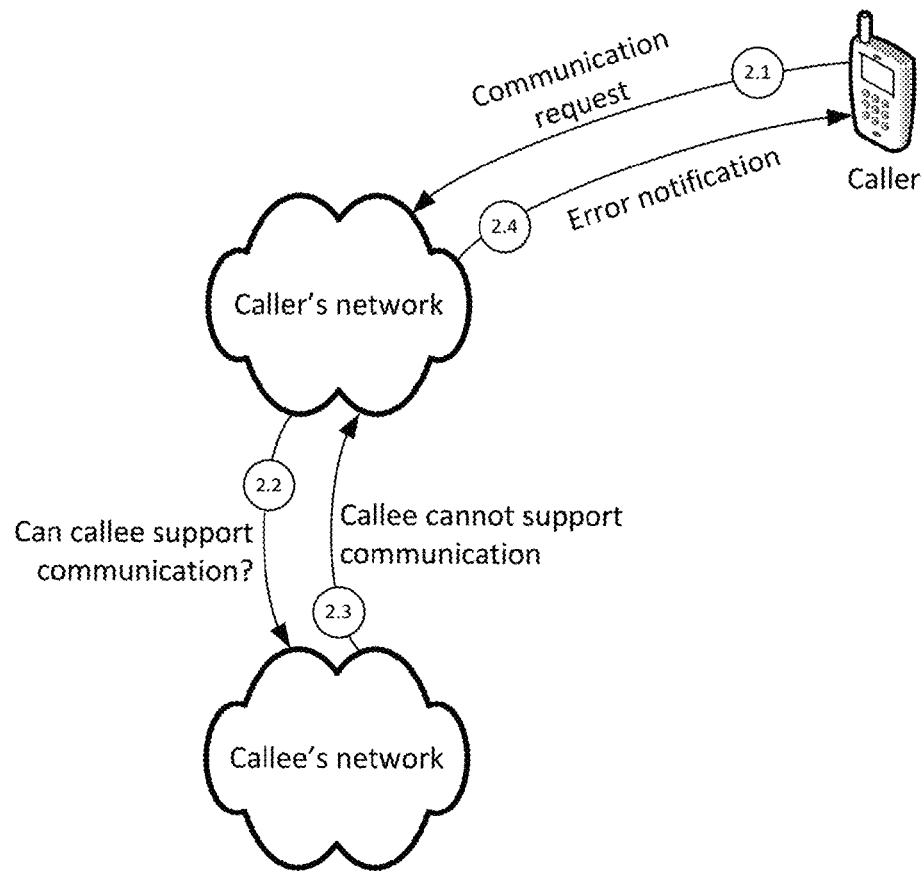
FIG. 2 illustrates in which excessive time may be expended when determining that a callee cannot support a requested communication.

The determination, using a GDSIR, of whether a callee can support a communication, may be advantageous over techniques in which a GDSIR is not used. For example, as shown in FIG. 2, a caller may request (at arrow "2.1") a communication. Since a GDSIR is not available in this example, the caller's network does not have ready access to information that may be used to determine whether the callee can support the requested communication. Thus, as shown, the caller's network may request (at arrow "2.2") information indicating whether the callee can support the requested communication.

Assume, in this example, that the callee cannot support requested the communication (e.g., the callee's device and/or network does not support a codec associated with the communication, the callee's device does not include an application associated with the communication, the callee is not subscribed to a service that enables the communication, etc.). The callee's network may determine that the callee cannot support the requested communication, and may output (at arrow "2.3"), to the caller's network, an indication that the callee cannot support the communication. The caller's network may provide (at arrow "2.4") an error notification to the caller. The caller may be frustrated, since the communication was not able to be placed. Adding to the frustration, the various communications between the caller's network and the callee's network may consume an excessive amount of time.

These frustrations may be alleviated and/or eliminated by implementations described herein (e.g., as discussed above with respect to FIG. 1). For instance, in situations where a callee's device does not support a requested type of communication, the communication can be automatically transcoded to a format that is supported by the callee's device. In situations where a communication cannot be transcoded to a format that is supported by the callee's device, the caller's network may provide an error notification to the caller. Since the caller's network may not need to communicate with the callee's network in order to determine whether the callee can support the requested communication, the time taken to provide the error notification to the caller may be less than situations where the caller's network may not need to communicate with the callee's network in order to determine whether the callee can support the requested communication. For example, in some implementations, the caller's network may maintain a local cached copy of some or all of the information stored by the GDSIR, which may be accessed to determine whether callees, associated with other networks, can support a particular communication.

Figure 3:
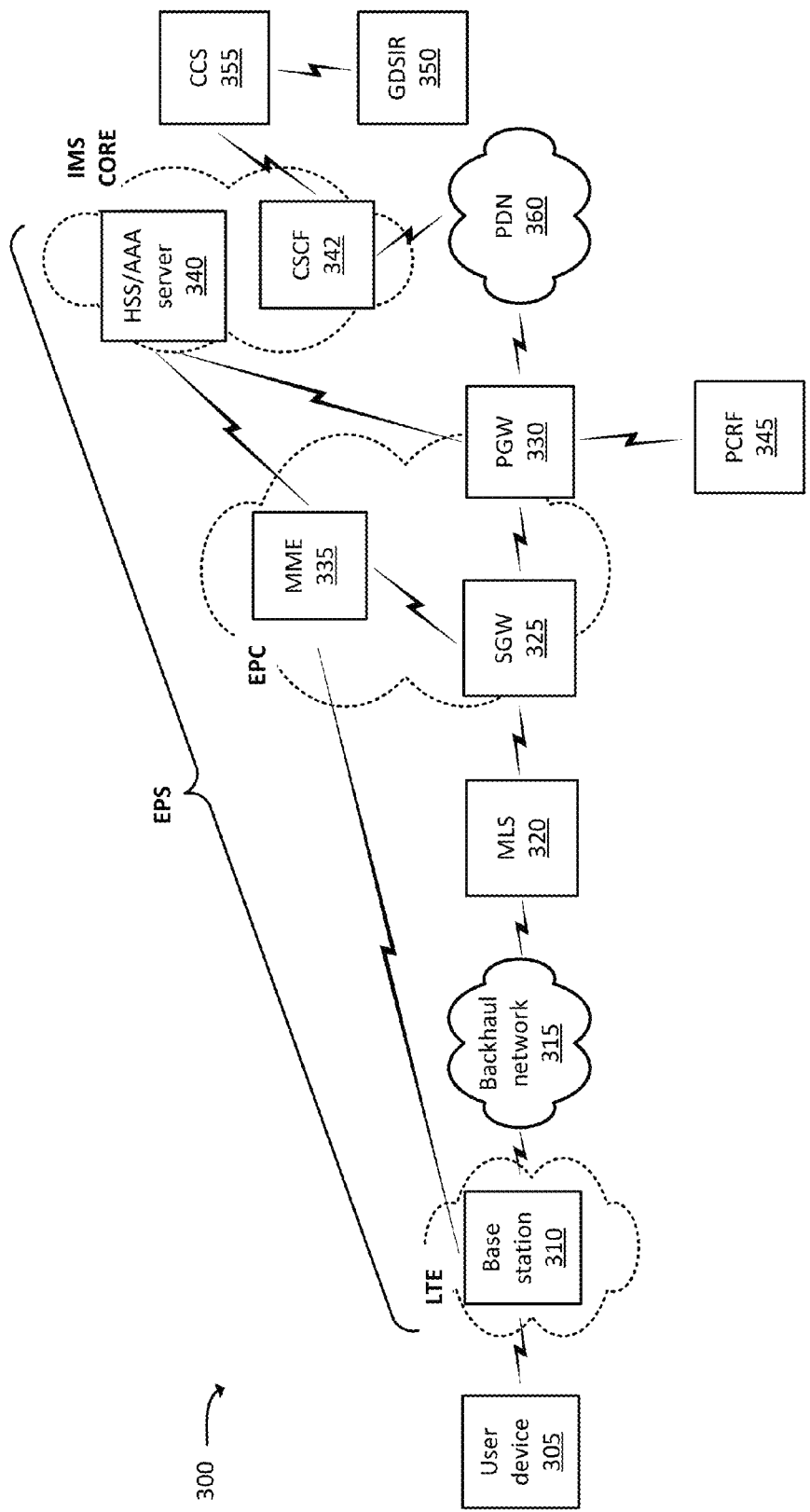
FIGS. 3 and 4 illustrate examples of one or more environments in which systems and/or methods, described herein, may be implemented.
Figure 4:
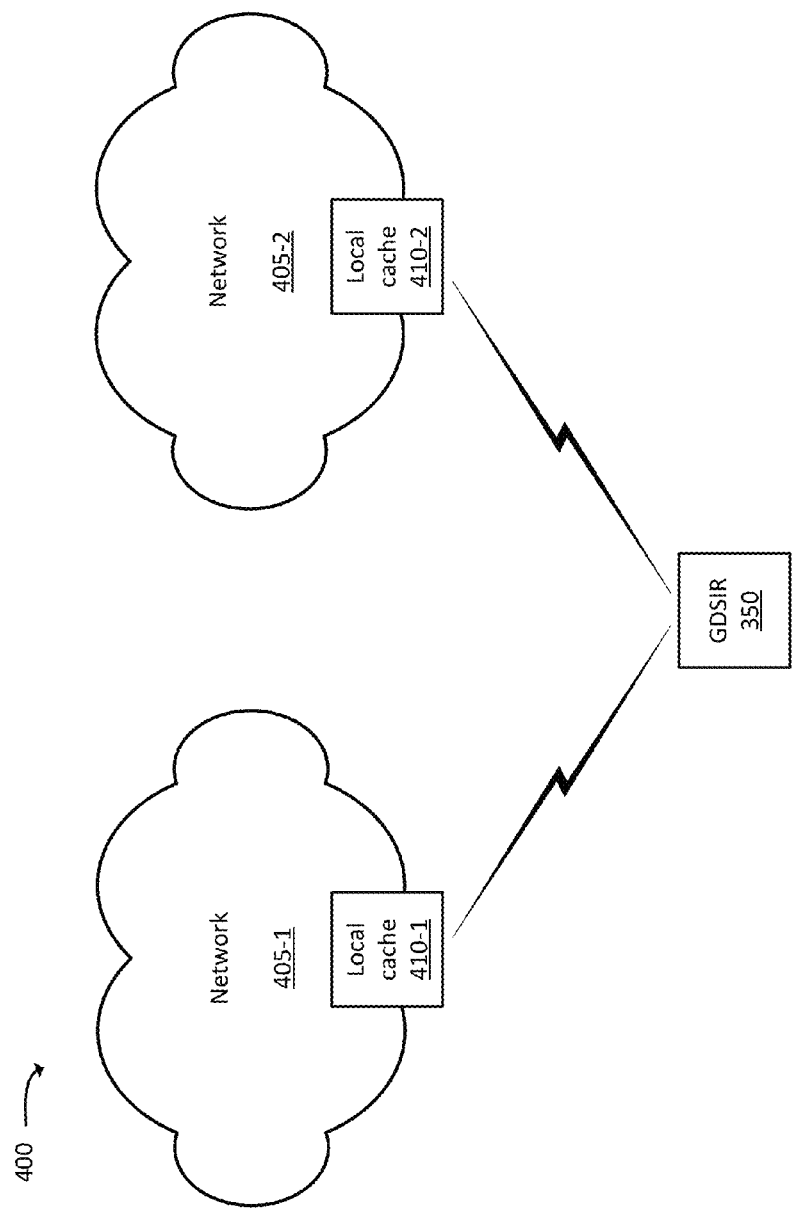

FIGS. 3 and 4 illustrate example environments 300 and 400, respectively, in which systems and/or methods described herein may be implemented. As shown in FIG. 3, environment 300 may include user device 305, base station 310, backhaul network 315, multi-layer switch ("MLS") 320, serving gateway ("SGW") 325, packet data network ("PDN") gateway ("PGW") 330, mobility management entity device ("MME") 335, home subscriber server ("HSS")/authentication, authorization, accounting ("AAA") server 340 (hereinafter referred to as "HSS/AAA server 340"), call session control function ("CSCF") 342, policy charging and rules function ("PCRF") 345, GDSIR 350, call compatibility server ("CCS") 355, and PDN 360.

Environment 300 may include an evolved packet system ("EPS") that includes a long term evolution ("LTE") network and/or an evolved packet core ("EPC") network that operate based on a third generation partnership project ("3GPP") wireless communication standard. The LTE network may be, or may include, a radio access network ("RAN") that includes one or more base stations 310, some or all of which may take the form of an eNB, via which user device 305 may communicate with the EPC network. The EPC network may include one or more SGWs 325, PGWs 330, and/or MMEs 335, and may enable user device 305 to communicate with PDN 360 and/or an Internet protocol ("IP") multimedia subsystem ("IMS") core network. The IMS core network may include HSS/AAA server 340 and CSCF 342, and may manage authentication, session initiation, account information, a user profile, etc., associated with user device 305.

User device 305 may include any computation and communication device, such as a wireless mobile communication device that is capable of communicating with base station 310 and/or PDN 360. For example, user device 305 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 305 may send traffic to and/or receive traffic from PDN 360 via base station 310, backhaul network 315, MLS 320, SGW 325, and/or PGW 330.

Base station 310 may include one or more network devices that receive, process, and/or transmit traffic, such as calls, audio, video, text, and/or other data, destined for and/or received from user device 305. In one example, base station 310 may be an evolved Node B ("eNB") device and may be part of the LTE network. Additionally, or alternatively, one or more other base stations 310 may be associated with a RAN that is not associated with the LTE network (e.g., a wireless hot spot, a wireless access point, etc.). Base station 310 may receive traffic from and/or send traffic to PDN 360 via SGW 325 and PGW 330. Base station 310 may send traffic to and/or receive traffic from user device 305 via, for example, an air interface.

Backhaul network 315 may include one or more networking devices (e.g., routers and/or switches) and links (e.g., fiber or coaxial links), that connect respective base station 310 to a core network (e.g., a core network that includes MLS 320, SGW 325, and/or PGW 330).

MLS 320 may include one or more network devices that perform switching functionality on traffic received from SGW 325 and/or backhaul network 315. MLS 320 may operate multiple layers of the Open Systems Interconnection ("OSI") reference model, in contrast with other types of switches that traditionally operate only on the Data Link Layer ("DLL"). For example, MLS 320 may perform deep packet inspection to perform routing functions.

SGW 325 may include one or more network devices that gather, process, search, store, and/or provide information in a manner described herein. SGW 325 may, for example, aggregate traffic received from one or more base stations 310 and may send the aggregated traffic to PDN 360 via PGW 330.

PGW 330 may include one or more network devices that gather, process, search, store, and/or provide information in a manner described herein. PGW 330 may aggregate traffic received from one or more SGWs 325, etc. and may send the aggregated traffic to PDN 360. PGW 330 may also, or alternatively, receive traffic from PDN 360 and may send the traffic toward user device 305 via SGW 325 and/or base station 310.

MME 335 may include one or more computation and communication devices that perform operations to register user device 305 with the EPS, to establish bearer channels associated with a session with user device 305, to hand off user device 305 from the EPS to another network, to hand off user device 305 from the other network to the EPS, and/or to perform other operations. MME 335 may perform policing operations on traffic destined for and/or received from user device 305.

HSS/AAA server 340 may include one or more server devices that manage, update, and/or store, in a memory associated with HSS/AAA server 340, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber (e.g., a subscriber associated with user device 305); information regarding services to which particular subscribers are subscribed (e.g., communication services, such as video conferencing services, voice chat services, etc.); and/or other information. Additionally, or alternatively, HSS/AAA server 340 may perform authentication, authorization, and/or accounting operations associated with the subscriber and/or a communication session with user device 305.

CSCF 342 may include one or more server devices that facilitate the setup of a communication session between one user device 305 and another user device 305. A particular CSCF 342 may be assigned to serve a particular user device 305 when user device registers with the IMS network.

PCRF 345 may include one or more server devices that aggregate information to and from the EPC network and/or other sources. PCRF 345 may receive information regarding policies and/or subscriptions from one or more sources, such as subscriber databases and/or from one or more users (such as, for example, an administrator associated with PCRF 345).

GDSIR 350 may include one or more server devices that receive and/or store information regarding subscribers. For example, GDSIR 350 may receive subscriber information from HSS/AAA server 340, and/or from one or more devices of one or more other networks (e.g., from a network associated with a different service provider than a service provider associated with base station 310, SGW 325, PGW 330, HSS/AAA server 340, etc). In some implementations, as described below, multiple GDSIRs 350 may deployed in a hierarchical manner. For example, networks may maintain locally cached copies of some or all of the data associated GDSIR 350.

CCS 355 may include one or more server devices that determine whether a callee, associated with a requested communication, is able to support the requested communication. For example, as described below, CCS 355 may access information stored by GDSIR 350 in order to determine whether the callee's device capabilities and/or subscriber capabilities are sufficient to support the requested communication. In some implementations, CCS 355 may perform transcoding (e.g., may decode an encoded communication and/or apply a different codec to a communication) and/or other techniques in order to facilitate communications to a callee whose device capabilities and/or subscriber capabilities do not support a requested communication. In some implementations, CCS 355 may be integrated with CSCF 342 in the IMS network, or may be implemented separately in the IMS network or other type of network. When implemented separately, when CSCF 342 receives a call setup request from user device 305, CSCF 342 may send the call setup request to CCS 335. Based on the determination of whether modification or transcoding is required by CCS 335, CCSCF may insert the required transcoding, modification, or interworking function or device, located in PDN 360 or somewhere else, for the communications between caller's user device 305-1 and callee's user device 305-2.

While shown in FIG. 3 as connected to PDN 360, GDSIR 350 and CCS 355 may be communicatively coupled to one or more other devices and/or networks. For example, in some implementations, GDSIR 350 may be connected to HSS/AAA server 340 via a direct connection and/or via a network other than PDN 360. As another example, in some implementations, CCS 355 may be connected to GDSIR 350 via a direct connection and/or via a network other than PDN 360.

PDN 360 may include one or more wired and/or wireless networks. For example, PDN 360 may include a packet data network ("PDN"), such as an Internet Protocol ("IP")-based PDN. PDN 360 may include, for example, a wide area network ("WAN") such as the Internet, a core network of a telecommunications provider, a private enterprise network, and/or one or more other networks. User device 305 may connect, through PGW 330, to data servers, application servers, other user devices 305, and/or to other servers or applications that are coupled to PDN 360.

FIG. 4 illustrates another example environment 400, in which systems and/or methods described herein may be implemented. Portions of environment 400 may correspond to portions of environment 300. For example, networks 405-1 and 405-2 (sometimes hereinafter referred to individually as "network 405," or collectively as "networks 405") may each include one or more components shown in FIG. 3. For example, network 405-1 may include a set of base stations 310, SGWs 325, PGWs 330, etc., while network 405-2 may include another set of base stations 310, SGWs 325, PGWs 330. In some implementations, networks 405 may each be associated with a different service provider (e.g., wireless telecommunications providers, or "carriers"). Networks 405 may each include a cellular network, such as, for example, a 2G network, a 3G network, a 4G network, etc. In some implementations, networks 405 may additionally, or alternatively, include a non-cellular network, such as a Wi-Fi network, a personal area network ("PAN"), a wired network, etc.

A particular network 405 may maintain information regarding subscribers associated with the network (e.g., using HSS/AAA server 340 and/or another device). As shown, networks 405-1 and 405-2 may communicate with GDSIR 350. For example, network 405-1 may provide information, to GDSIR 350, regarding subscribers associated with network 405-1, and network 405-2 may provide information, to GDSIR 350, regarding subscribers associated with network 405-2. Further, network 405-1 may receive information, from GDSIR 350, regarding subscribers associated with network 405-2, and network 405-2 may receive information, from GDSIR 350, regarding subscribers associated with network 405-1. In some implementations, GDSIR may be accessible via the Internet and/or another network (e.g., via a network external to networks 405-1 and/or 405-2).

As shown, networks 405 may each maintain a local cache 410 (e.g., network 405-1 may maintain local cache 410-1, and network 405-2 may maintain local cache 410-2). Local cache 410 may receive and store some or all of the information stored by GDSIR 350. For example, local cache 410-1 may store information regarding subscribers associated with network 405-2. In some implementations, local cache 410-1 may also store information regarding subscribers associated with network 405-1. As described below, when a communication is requested, via network 405-1, to a subscriber associated with network 405-2, network 405-1 may access local cache 410-1 and/or GDSIR 350 in order to determine whether the subscriber, associated with network 405-2, can support the requested communication. Since local cache 410-1 may be maintained by a service provider associated with network 405-1, access to local cache 410-1 may be faster than if network 405-1 were to attempt to obtain the information from GDSIR 350.

The quantity of devices and/or networks, illustrated in FIGS. 3 and 4, is provided for explanatory purposes only. In practice, there may be additional devices and/or networks; fewer devices and/or networks; different devices and/or networks; or differently arranged devices and/or networks than illustrated in FIGS. 3 and/or 4. For example, some networks 405 may not include local cache 410. In some such implementations, a particular network 405 may communicate directly (e.g., via the Internet and/or another network)

with GDSIR 350. Alternatively, or additionally, one or more of the devices of environment 300 and/or 400 may perform one or more functions described as being performed by another one or more of the devices of environments 300 and/or 400. Devices of environments 300 and/or 400 may interconnect via wired connections, wireless connections, or a combination of wired and wireless connections.

Figure 5:
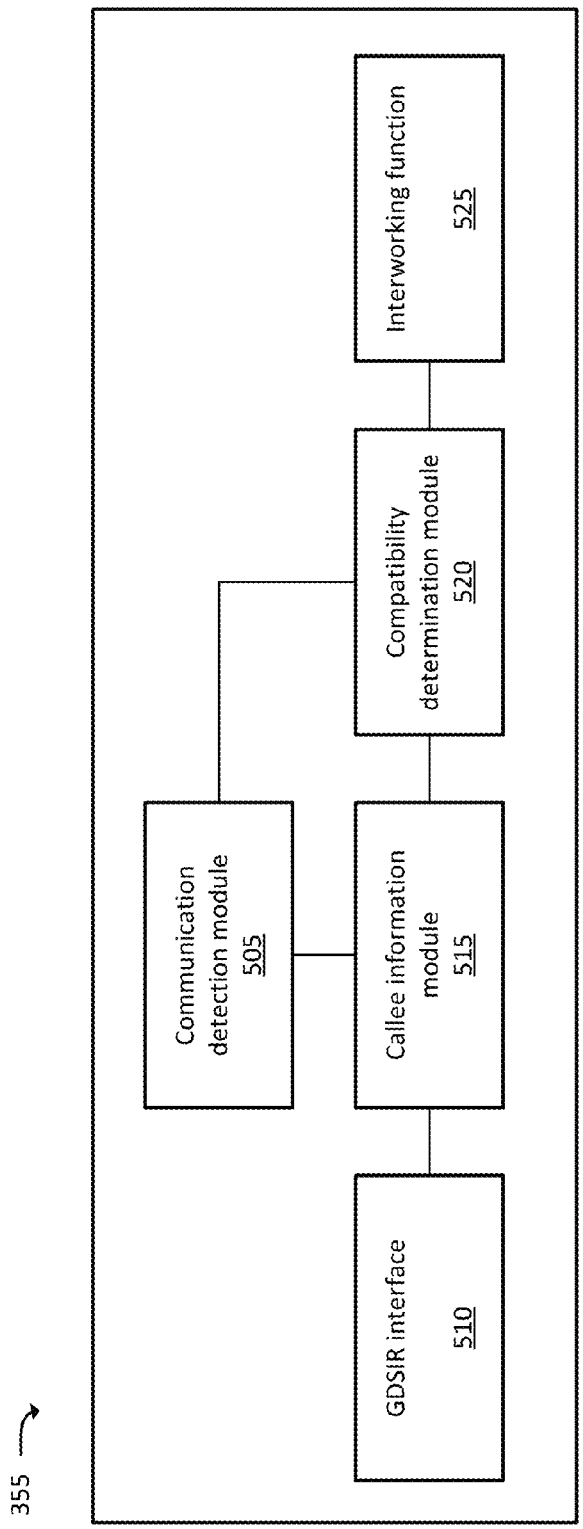
FIG. 5 illustrates example functional components of a communication compatibility server.

FIG. 5 illustrates example functional components of CCS 355, in accordance with one or more implementations. As shown, CCS 355 may include communication detection module 505, GDSIR interface 510, callee information module 515, compatibility determination module 520, and interworking function 525. In other implementations, CCS 355 may include additional, fewer, different, or differently arranged components. In some implementations, the functionality described below, with respect to one component, may be performed by one or more other components. Further, in some implementations, the functionality described below, with respect to multiple components, may be performed by one component.

Communication detection module 505 may detect a communication request, associated with a caller (e.g., a particular user device 305 that requested the communication). For example, CCS 355 and user device 305 may be associated with the same telecommunications network, operated by a particular telecommunications service provider. When user device 305 requests the initiation of a communication (e.g., a voice call, a video call, a chat session, a file transfer session, etc.), one or more devices associated with the network (e.g., a communications application server associated with an IMS core network, MME 335, and/or another device) may output an indication to communication detection module 505, regarding the requested communication. The indication may include information regarding an identity of user device 305 (e.g., a mobile directory number ("MDN"), an International Mobile Subscriber Identity ("IMSI") value, an International Mobile Station Equipment Identity ("IMEI"), a media access control ("MAC") number, an IP address, a Session Initiation Protocol ("SIP") identifier, and/or other identifying information). The indication may additionally, or alternatively, include information regarding a callee (e.g., a particular user device 305, to which the communication is requested). The information regarding the callee may include, for example, an MDN, an IP address, an SIP identifier, and/or other identifying information.

The indication may, in some implementations, include information regarding the requested communication. For example, the indication may indicate the type of communication (e.g., voice call, video call, file transfer session, chat session, etc.). In some implementations, the indication may include information regarding parameters associated with the requested communication. For instance, assume that the type of requested communication is a video call. The parameters may include audio and/or video codecs associated with the video call, a video resolution associated with the video call, a quantity of audio channels associated with the video call, a name of an application needed to conduct the video call, information regarding a service or subscription needed to conduct the video call, and/or other information.

GDSIR interface 510 may allow components of CCS 355 (e.g., callee information module 515) to communicate with GDSIR 350 and/or local cache 410. For example, in some implementations, GDSIR 350 may be provided by a third party (e.g., an entity other than a service provider associated with CCS 355). In some such implementations, GDSIR 350 may be associated with an application programming interface ("API"), and/or another type of interface, which may allow other devices (e.g., CCS 355, via GDSIR interface 510) to request and receive information from GDSIR 350. The API may be used to authenticate CCS 355, and/or to control what information can be provided to CCS 355. For example, GDSIR 350 may provide information to GDSIR interface 510, regarding certain user devices 305 and/or user devices 305 associated with certain networks 405, without providing information regarding other user devices 305 and/or other networks 405.

Callee information module 515 may receive and/or store information regarding the callee, associated with the communication detected by communication detection module 505. For example, callee information module 515 may receive the callee information, via GDSIR interface 510, from GDSIR 350, local cache 410, and/or another device. In some implementations, callee information module 515 may request the callee information based on, for example, identifying information received via communication detection module 505. For example, callee information module 515 may request callee information associated with an MDN, indicated by a communication request. The callee information may include, for example, information regarding device capabilities (e.g., hardware and/or software capabilities of user device 305, associated with the callee) and/or subscriber capabilities (e.g., services to which the callee is subscribed).

Figure 6:
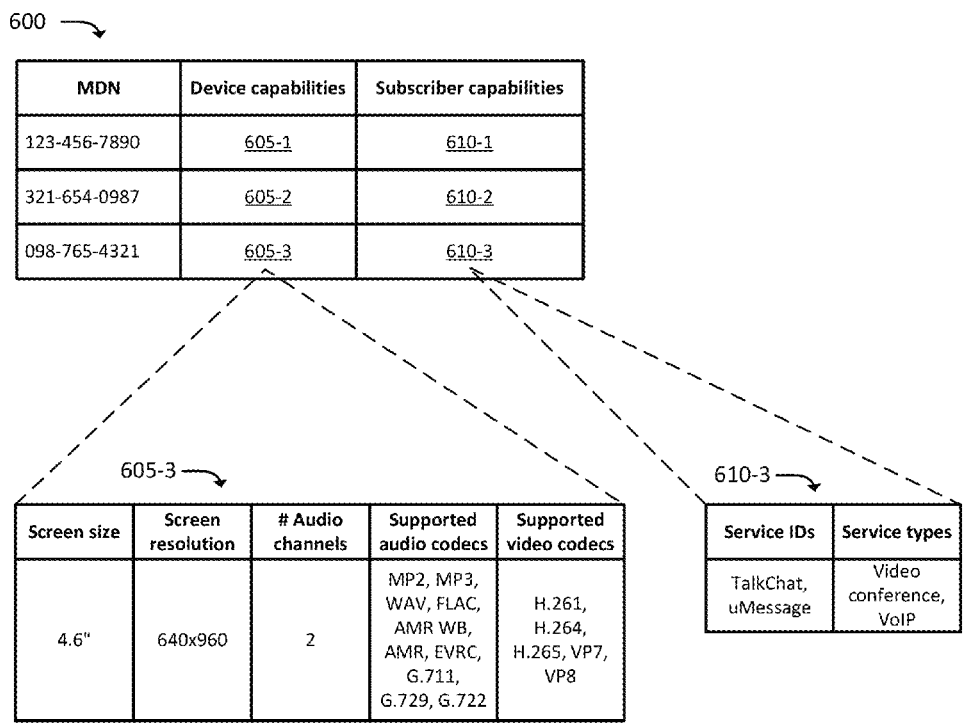
FIG. 6 illustrates an example data structure that may be stored by a global device/subscriber information repository.

FIG. 6 illustrates an example data structure 600, which may be stored by callee information module 515 and/or GDSIR 350. The information, stored in data structure 600, may correspond to callee information, which may be obtained by callee information module 515 from GDSIR 350. As described below with respect to FIG. 7, the information, stored in data structures 600-615 may be received, by GDSIR 350, from user device 305 and/or another device (e.g., a device that performs provisioning on behalf of user device 305).

As shown, data structure 600 may include the following example fields: "MDN," "Device capabilities," and "Subscriber capabilities." The "MDN" field may include an MDN associated with a particular user device 305. In some implementations, in addition to, or in lieu of, an "MDN" field, data structure 600 may include other identifying information for user device 305, such as an IP address, an SIP identifier, etc. The "Device capabilities" field, for a particular user device 305, may include another data structure 605. For example, the user devices 305 associated with the MDNs "123-456-7890," "321-654-0987," and "098-765-4321" may be associated with data structures 605-1, 605-2, and 605-3, respectively.

Example data structure 605-3, shown in FIG. 6, includes the example fields: "Screen size," "Screen resolution," "# [Number of] Audio channels," "Supported audio codecs," and "Supported video codecs." The "Screen size" field may indicate a measure of screen size of a particular user device 305, such as a diagonal measurement, height and width measurements, etc. The "Screen resolution" field may indicate a maximum supported resolution of a screen of user device 305, and/or may indicate a set of supported resolutions of the screen of user device 305. The "# Audio channels" field may indicate a maximum quantity of audio channels supported by user device 305, and/or may indicate a set of quantities of audio channels supported by user device 305 (e.g., may indicate that two channels (e.g., in a "2.0" arrangement), four channels (e.g., in a "3.1" arrangement), and six channels (e.g., in a "5.1" arrangement) are supported). The "Supported audio codecs" field may indicate a set of audio codecs supported by user device 305 (e.g., Adaptive Multi-Rate ("AMR"), AMR Wideband ("AMR WB"), Enhanced Variable Rate Codec ("EVRC"), International Telegraph Union Telecommunication Standardization Sector ("ITU-T") G.711, ITU-T G.722, ITU-T G.729, Moving Picture Experts Group ("MPEG") Audio Layer 2 ("MP2"), MP3, wave ("WAV"), Free Lossless Audio Codec ("FLAC"), and/or one or more other audio codecs). The "Supported video codecs" field may indicate a set of video codecs supported by user device 305 (e.g., ITU-T H.261, ITU-T H.264, High Efficiency Video Coding ("HEVC") H.265, On2 codecs such as VP7 or VP8, and/or one or more other video codecs).

The "Subscriber capabilities" field, for a particular user device 305, may include another data structure 610. For example, the user devices 305 associated with the MDNs "123-456-7890," "321-654-0987," and "098-765-4321" may be associated with data structures 610-1, 610-2, and 610-3, respectively. Example data structure 610-3, shown in FIG. 6, includes the example fields: "Service IDs [identifiers]" and "Service types." The "Service IDs" field may include identifiers, such as names or other identifiers, of services, with which a particular user device 305 is associated. For instance, user device 305 may be associated with a particular service when a subscriber, associated with user device 305, has subscribed to the service. The "Service types" field may identify types of services associated with user device 305 (e.g., types of services to which a subscriber, associated with user device 305, has subscribed).

Returning to FIG. 5, compatibility determination module 520 may determine, based on callee capabilities (e.g., device and/or subscriber capabilities, as determined by callee information module 515) and communication parameters (e.g., as determined by communication detection module 505), whether a particular callee can support a requested communication. For example, assume that communication detection module 505 determines that the requested communication is a video call. Compatibility determination module 520 may determine, based on subscription information received by callee information module 515, whether the callee is subscribed to a corresponding video call service. Additionally, or alternatively, compatibility determination module 520 may determine whether user device 305, associated with the callee, is capable of receiving the call (e.g., whether user device 305 can support a video and/or audio codec associated with the video call, whether user device 305 has a corresponding video call application installed, etc.).

In some situations, compatibility determination module 520 may determine that a callee does not support a requested communication. For example, a requested communication may be associated with an audio and/or video codec that is not supported by the callee. In some implementations, compatibility determination module 520 may determine that the communication can be modified, in order to be supported by the callee. For example, compatibility determination module 520 may determine that a communication can be transcoded (e.g., an original set of codecs may be removed and/or replaced with a different set of codecs) to a format supported by the callee. As another example, compatibility determination module 520 may determine that a communication may be otherwise modified, based on the callee's device capabilities (e.g., a resolution and/or size of a video communication may be altered based on a callee's device's screen size and/or supported resolution).

Interworking function 525 may modify a communication, based on the determination made by compatibility determination module 520. For example, interworking function 525 may include logic to transcode and/or otherwise modify communications, based on callee capabilities.

Figure 7:
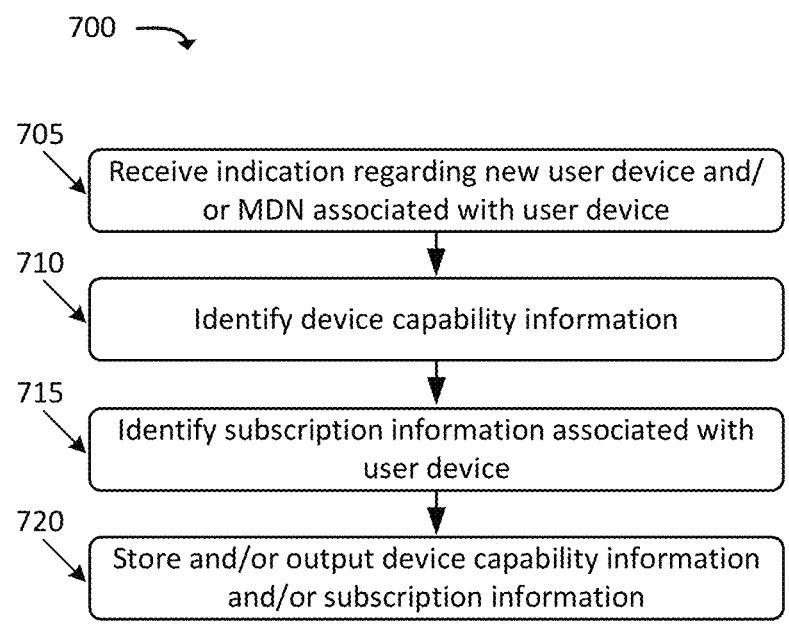
FIG. 7 illustrates an example process for determining device and/or subscriber information.

FIG. 7 illustrates an example process 700 for determining device and/or subscriber capability information. In some implementations, process 700 may be performed by GDSIR 350. In other implementations, some or all of process 700 may be performed by one or more devices in lieu of, or in addition to, GDSIR 350.

Process 700 may include receiving (at 705) an indication regarding a new user device and/or an MDN associated with a user device. For example, GDSIR 350 may receive the indication from HSS/AAA server 340 and/or another source (e.g., a device that performs provisioning of user devices 305). For instance, GDSIR 350 may receive the indication when user device 305 is initially activated for use by an end user, when an MDN is assigned to user device 305, when user device 305 is powered on, and/or at another time.

Process 700 may also include identifying (at 710) device capability information. For example, GDSIR 350 may receive device capability information from HSS/AAA server 340, user device 305, and/or another source. In some implementations, GDSIR 350 may identify the device capability information by accessing a data repository that includes information regarding the capabilities of different types (e.g., makes and models) of user devices 305. As mentioned above, device capability information may include information regarding audio and/or video codecs supported by user device 305, screen size and/or resolution, number of audio channels, communication-related applications installed on and/or supported by user device 305, etc.

Process 700 may further include identifying (at 715) subscriber information associated with the user device. For example, GDSIR 350 may receive subscriber capability information for a subscriber, associated with user device 305, from HSS/AAA server 340 and/or from another source. As mentioned above, subscriber capability information may include information regarding services subscribed to by a subscriber associated with user device 305.

Process 700 may additionally include storing and/or outputting (at 720) the device capability information and/or the subscription information. For example, GDSIR 350 may store the device capability information (identified at 705) and the subscriber information (identified at 710) in a local storage device associated with GDSIR 350. Additionally, or alternatively, GDSIR 350 may provide (e.g., may provide upon request and/or may "push," independent of a request) the information to one or more external sources, such as to one or more local caches 410 associated with one or more networks 405, to CCS 355, etc.

Figure 8:
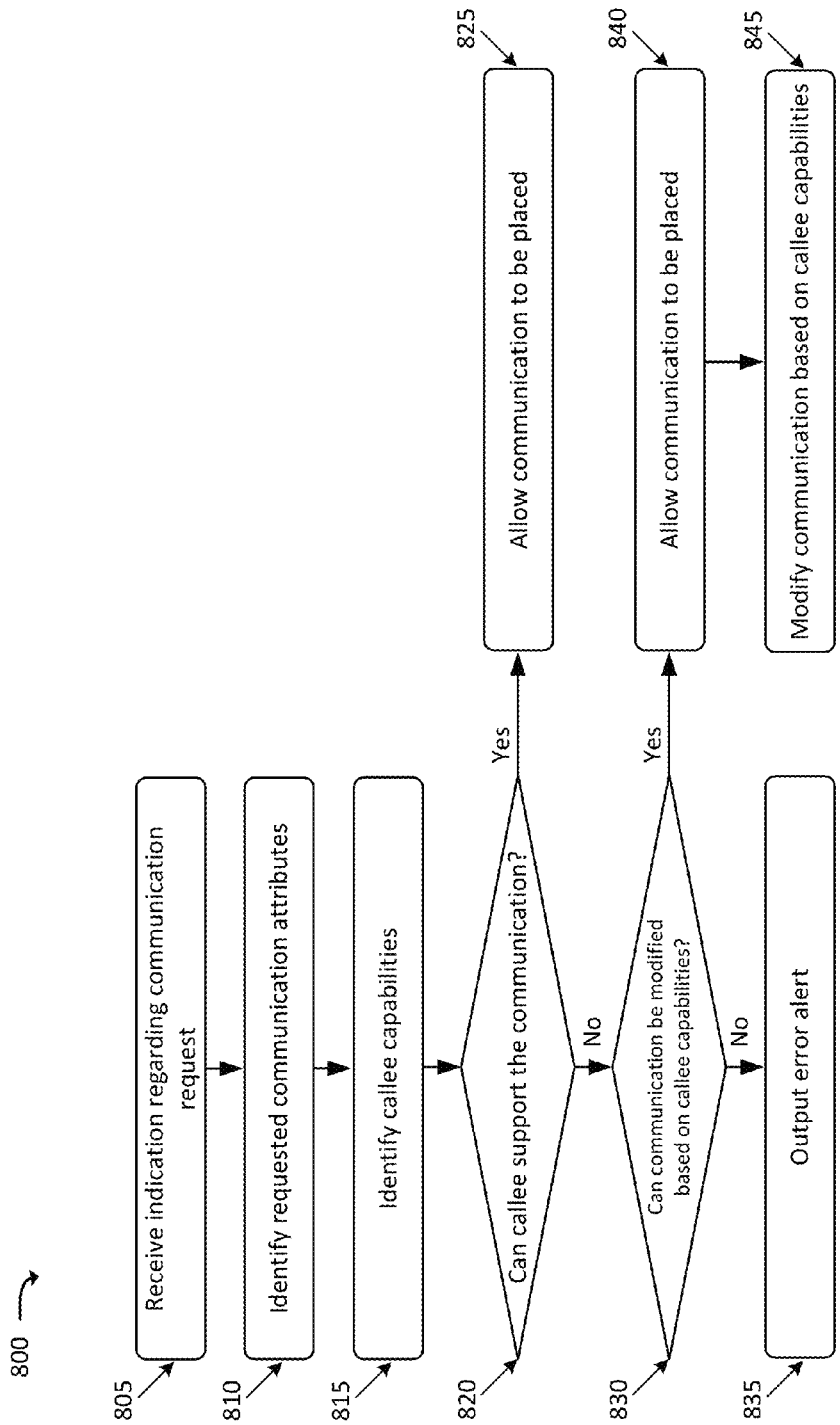
FIG. 8 illustrates an example process for handling a requested communication based on capabilities of a callee.

FIG. 8 illustrates an example process 800 for handling a requested communication, based on callee capabilities. In some implementations, process 800 may be performed by CCS 355. In other implementations, some or all of process 800 may be performed by one or more devices in lieu of, or in addition to, CCS 355.

Process 800 may include receiving (at 805), an indication regarding a communication request. For example, CCS 355 may receive the indication from MME 335, a communication application server (e.g., an application server associated with an IMS code network), and/or another device that is involved in the establishment of the communication. As mentioned above, the indication may include information identifying a callee, as well as parameters regarding the requested communication.

Process 800 may also include identifying (at 810) requested communication attributes. For example, as mentioned above, the indication (received at 805) may include parameters regarding the requested communication. The parameters may include, for example, audio and/or video codecs associated with the communication, display parameters (e.g., display resolution), audio parameters (e.g., quantity of audio channels), and/or other types of parameters.

Process 800 may further include identifying (at 815) callee capabilities. For example, CCS 355 may request, from GDSIR 350 and/or local cache 410, callee capability information. As mentioned above, the callee capability information may indicate device capabilities and/or subscriber capabilities, associated with the callee.

Process 800 may additionally include determining (at 820) whether the callee can support the requested communication. For example, as described above, CCS 355 may compare the callee capabilities to the parameters associated with the requested communication. If the callee can support the requested communication (at 820—YES), then process 800 may include allowing (at 825) the communication to be placed. For example, CCS 355 may output an indication (e.g., to a communication application server and/or another device involved in the establishment or carrying of the communication), indicating that the communication should be allowed to be placed. Based on this indication, the caller's network 405 may communicate with the callee's network 405, in order to establish the communication, using the requested parameters.

If, on the other hand, the callee cannot support the requested communication (at 820—NO), then process 800 may include determining (at 830) whether the communication can be modified based on the callee capabilities. For example, in situations where the callee's user device 305 does not support a particular audio and/or video codec, CCS 355 may identify an audio and/or video codec that is supported by the callee's user device 305. As another example, in situations where the callee's user device 305 does not include a necessary hardware and/or software component (e.g., if the callee's user device 305 does not include a display screen and the requested communication is a video call, if the callee's user device 305 does not have a necessary software application installed, etc.), and/or if the callee does not have a subscription to a service that is necessary to establish the communication, CCS 355 may determine that the communication cannot be modified based on the callee capabilities.

If the communication cannot be modified based on the callee capabilities (at 830—NO), then process 800 may include outputting (at 835) an error alert. For example, CCS 355 may output an error alert to user device 305, MME 335, and/or another device involved in the establishment of the communication. The error alert may include information indicating why the communication establishment failed (e.g., may indicate which callee capability or capabilities did not support the requested communication parameters). Thus, while the communication may fail to be established, the failure may be determined more quickly than if the callee's network were contacted to determine whether the callee could support the requested communication.

If, on the other hand, the communication can be modified based on the callee capabilities (at 830—YES), then process 800 may include allowing (at 840) the communication to be placed. Process 800 may also include modifying (at 845) the communication based on the callee capabilities. For example, CCS 355 may transcode and/or otherwise modify the communication, based on the callee capabilities (e.g., as described above with respect to interworking function 525). Additionally, or alternatively, CCS 355 may output an indication to another device, which may cause the other device to transcode and/or otherwise modify the communication.

Figure 9:
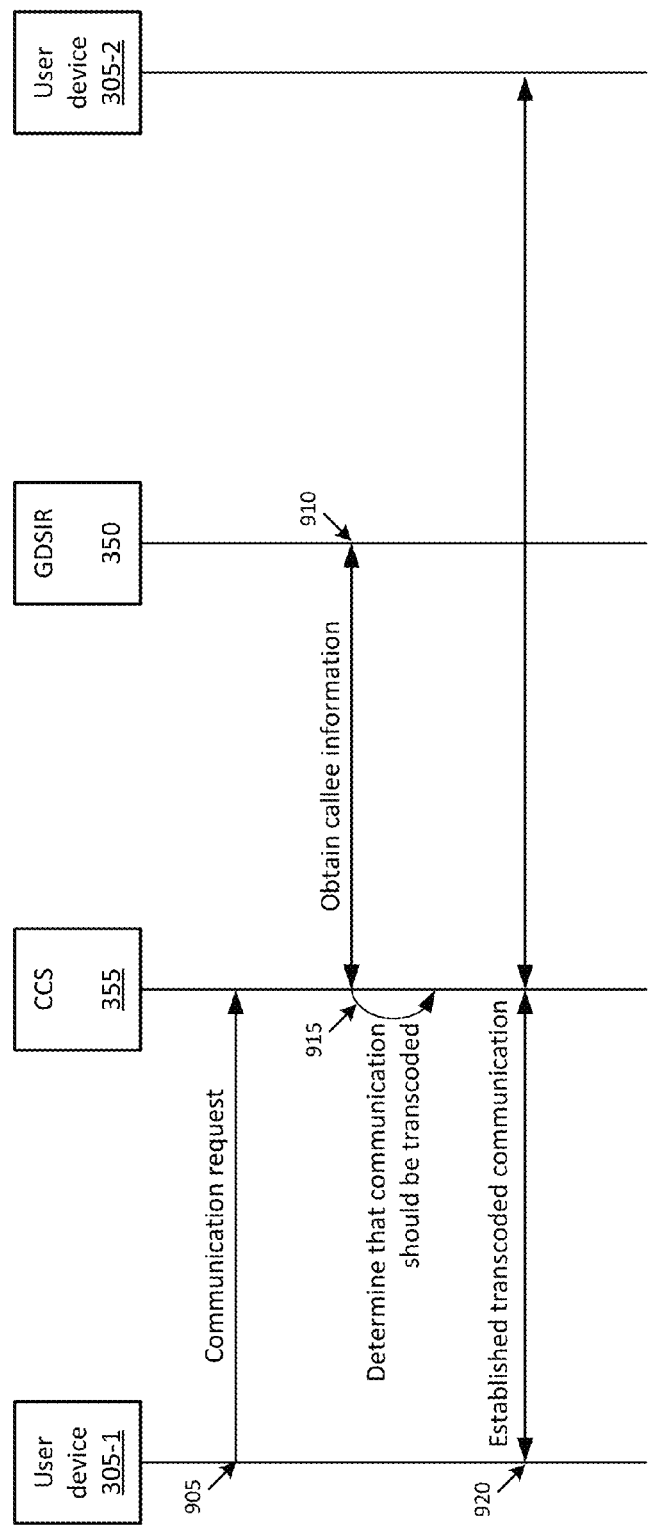
FIGS. 9-11 illustrate example signal flows corresponding to handling a requested communication based on capabilities of a callee.
Figure 10:
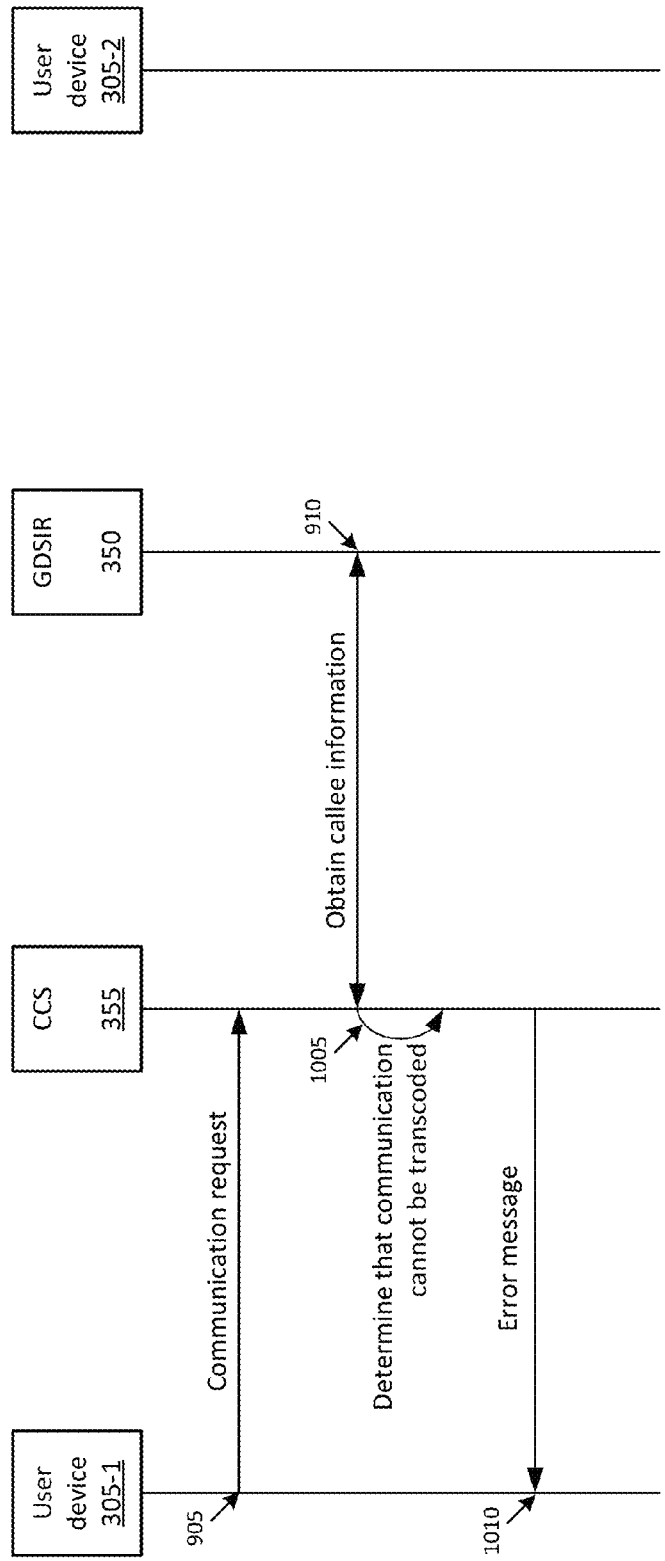
Figure 11:
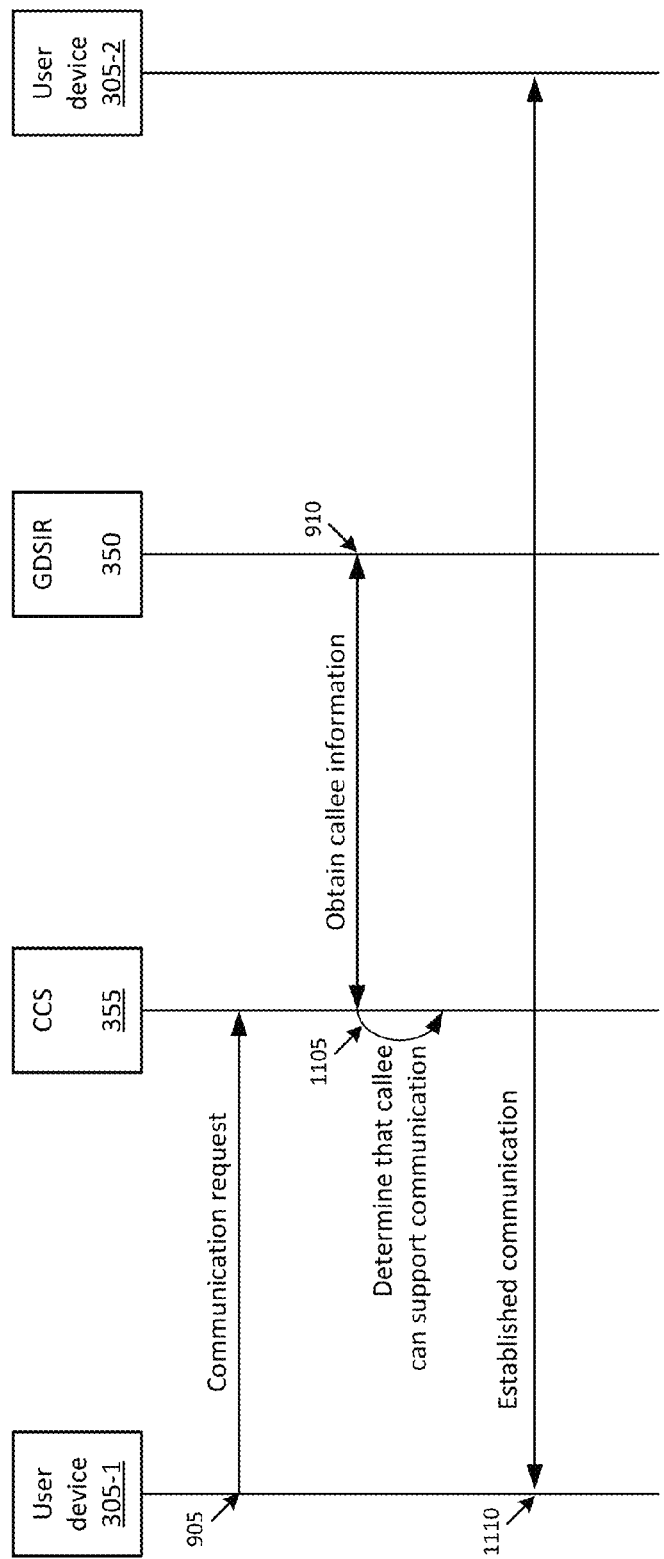

FIGS. 9-11 illustrate example signal flows relating to the handling of requested communications, based on callee capabilities. Similar signals (i.e., signals 905 and 910) that appear in all of FIGS. 9-11 are described only once below, for the sake of brevity.

As shown in FIG. 9, a caller's user device 305-1 may request (at 905) the establishment of a communication. The communication request, and/or an indication regarding the communication request, may be provided to CCS 355. For example, while shown in this figure as a signal from user device 305-1 to CCS 355, an indication regarding the communication request (at 905) may be provided to CCS 355 by one or more other devices (e.g., CSCF 342, PGW 330, and/or another device involved in the establishment of communications).

CCS 355 may obtain (at 915) callee information from GDSIR 350. While pictured as obtaining callee information from GDSIR 350, CCS 355 may alternatively, or additionally, obtain the callee information from local cache 410. As further shown in FIG. 9, CCS 355 may determine (at 915) that the communication should be transcoded. For instance, CCS 355 may determine that the callee does not support the requested communication, but that the communication can be transcoded based on the callee's capabilities. The communication may be established (at 920), and CCS 355 may insert a transcoder to the call, to transcode signals from user device 305-1 to the callee's user device user device 305-2, and/or may transcode signals from user device 305-2 to user device 305-1. In some implementations, CCS 355 may insert a different type of interworking function (e.g., IPv6 to IPv4 conversion, etc.) as needed, instead of the transcoder, to enable the caller's user device 305-1 to communicate with the callee's user device 305-2.

As shown in FIG. 10, after a communication is requested (at 905) by user device 305-1, and callee information is obtained (at 910) from GDSIR 350 and/or local cache 410, CCS 355 may determine (at 1005) that the requested communication is not supported by the callee and that the communication cannot be transcoded. For instance, as described above, the callee's device and/or subscription capabilities may not support the communication, even if the communication were transcoded and/or otherwise modified. Based on the determination (made at 1005), CCS 355 may output an error message to user device 305-1, indicating that the communication was not able to be established. As also mentioned above, the error message may include further details, which may be useful to a user of user device 305-1. For example, the user may attempt to establish a different type of communication (e.g., may attempt a voice call if a video call failed), based on the error message.

As shown in FIG. 11, after a communication is requested (at 905) by user device 305-1, and callee information is obtained (at 910) from GDSIR 350 and/or local cache 410, CCS 355 may determine (at 1105) that the callee can support the requested communication. For example, the callee's user device 305-2 may support codecs associated with the requested communication and/or the callee may be subscribed to services associated with the requested communication. Based on this determination, the call may be established between user device 305-1 and user device 305-2. Since the communication does not need to be transcoded and/or otherwise modified based on the callee's capabilities, CCS 355 may not act as a signal bearer for the communication.

Figure 12:
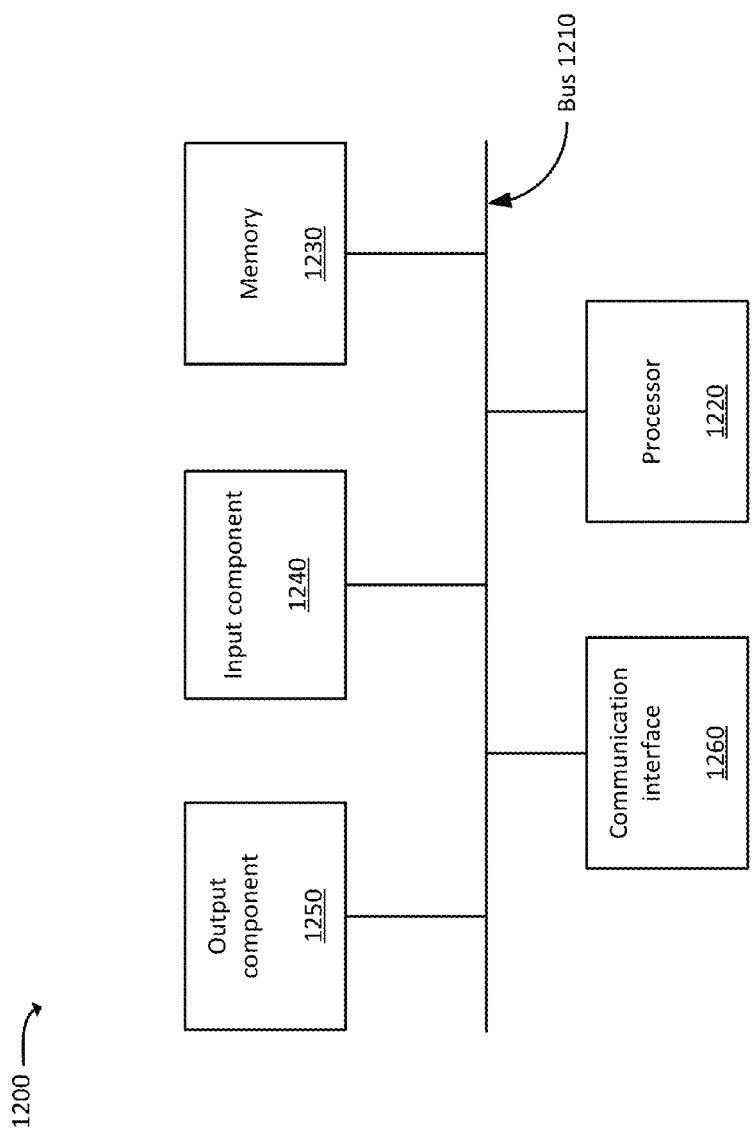
FIG. 12 illustrates example components of one or more devices, according to one or more implementations described herein.

FIG. 12 is a diagram of example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 7 and 8, the order of the blocks may be modified in other implementations. Further, non-dependent blocks may be performed in parallel.

Additionally, while examples of data structures are illustrated in FIG. 6 as including certain types of information, in practice, these data structures may store additional, fewer, different, or differently arranged types of information than shown in these figures. Furthermore, while these data structures are shown as tables, in practice, these data structures may take the form of any other type of data structure, such as an array, a linked list, a hash table, a tree, and/or any other type of data structure.

Furthermore, while the above examples are described certain implementations in terms of a "caller" and a "callee," it is to be understood that techniques, in accordance with the above description, may be used for communications that are not necessarily referred to as "calls." For example, similar techniques may apply to chat sessions, file transfer sessions, and/or other types of communications. Thus, in some implementations, the term "caller" may apply to a party who requests that a communication be initiated, while the term "callee" may apply to a party with whom the caller desires to communicate.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
   receiving, by one or more server devices and from a set of network devices associated with a second telecommunications network, capability information regarding a set of user devices that are registered with the second telecommunications network,
      wherein the capability information includes, on a per-user device basis, capability information specific to each user device, of the set of user devices,
      the capability information for each particular user device, of the set of user devices, specifying at least one of:
         a set of audio codecs supported by each particular user device, or
         a set of video codecs supported by each particular user device,
      the capability information for each particular user device further specifying one or more hardware characteristics of the each particular user device, the one or more hardware characteristics including at least one of:
         a screen size of the each particular user device,
         a screen resolution of the each particular user device, or
         a quantity of audio channels supported by the each particular user device;
   receiving, by the one or more server devices, an indication regarding a requested communication,
      the communication being received from a first user device, associated with a first telecommunications network,
      the communication being directed to a second user device, associated with the second telecommunications network, the second user device being included in the set of user devices for which the capability information was received,
      the second telecommunications network being operated by a different service provider than a service provider operating the first telecommunications network;
   identifying, by the one or more server devices, a set of parameters associated with the requested communication;
   identifying, by the one or more server devices, callee capability information associated with the second user device,
      the callee capability information being identified based on the capability information received from the set of network devices associated with the second network, in lieu of requesting the callee capability information from the second telecommunications network;
   comparing, by the one or more server devices, the callee capability information to the set of parameters associated with the requested communication;
   determining, based on the comparing and by the one or more server devices, that the set of audio codecs or the set of video codecs, supported by the second user device, does not include a first codec indicated by the set of parameters associated with the requested communication; and
   handling, by the one or more server devices, the communication request based on the comparing, wherein handling the communication request includes:
      transcoding the communication, established based on the communication request, from the first codec, to a second codec that is included in the set of audio codecs or the set of video codecs, supported by the second user device.

2. The method of claim 1, wherein the communication is a first communication, the method further comprising:
   receiving an indication regarding a requested second communication, from the first user device, the second communication being directed to a third user device, associated with the second telecommunications network,
      the third user device being included in the set of user devices for which the capability information was received;
   identifying, based on the received capability information, callee capability information associated with the third user device;
   comparing the callee capability information, associated with the third user device, to a set of parameters associated with the requested second communication;
   determining, based on the comparing of the callee compatibility information associated with the third user device to the set of parameters associated with the second communication, that a subscription, associated with the third user device, does not support the requested second communication; and
   outputting an error alert, indicating that the second communication was not successfully established.

3. The method of claim 1, wherein identifying the callee capability information, associated with the second user device, includes:
   requesting the callee capability information from a server device that stores information regarding subscribers associated with a plurality of telecommunications service providers.

4. The method of claim 3, wherein the server device, that stores information regarding subscribers associated with a plurality of telecommunications service providers, is locally maintained as part of the first telecommunications network.

5. The method of claim 1, wherein the set of parameters, associated with the requested communication, includes parameters regarding at least one of:
   a set of audio codecs associated with the requested communication,
   a set of video codecs associated with the requested communication, an identification of an application associated with the requested communication, a type of the requested communication, or an identification of a service associated with the requested communication.

6. The method of claim 1, wherein the callee capability information, associated with the second user device, further includes information regarding at least one of:

a set of applications associated with the second user device, a set of types of communications associated with a subscriber, associated with the second user device, or an identification of a set of services associated with the subscriber, associated with the second user device.

7. The method of claim 1, wherein the transcoding includes:

receiving the communication from the first user device, the communication including a first codec; and modifying the communication, the modified communication including the second codec, the method further including:

outputting the modified communication to the second user device.

8. A system, comprising:

a memory device storing a set of processor-executable instructions; and a processor configured to execute the processor-executable instructions, wherein executing the processor-executable instructions causes the processor to:

receive, from a set of devices associated with a second telecommunications network, capability information regarding a set of user devices that are registered with the second telecommunications network, wherein the capability information indicates, on a per-user device basis, different sets of codecs that are supported by different ones of the user devices, in the set of user devices, the capability information for each particular user device, of the set of user devices, further specifying one or more hardware characteristics of the each particular user device, the one or more hardware characteristics including at least one of:

a screen size of the each particular user device, a screen resolution of the each particular user device, or a quantity of audio channels supported by the each particular user device, wherein the system is external to the second telecommunications network;

receive an indication regarding a requested communication, the communication being received from a first user device, associated with a first telecommunications network, the communication being directed to a second user device, associated with the second telecommunications network, the second user device being included in the set of user devices for which the capability information was received, the second telecommunications network being operated by a different service provider than a service provider operating the first telecommunications network;

identify a set of parameters associated with the requested communication;

identify callee capability information associated with the second user device, the callee capability information being based on the capability information received from the set of devices associated with the second network, in lieu of requesting the callee capability information from the second telecommunications network;

compare the callee capability information to the set of parameters associated with the requested communication;

determine, based on the comparing, that a particular set of codecs, supported by the second user device, does not include a first codec indicated by the set of parameters associated with the requested communication; and transcode the communication, established based on the communication request, from the first codec, to a second codec that is included in the particular set of codecs, supported by the second user device.

9. The system of claim 8, wherein the communication is a first communication, wherein executing the processor-executable instructions further causes the processor to:

receive an indication regarding a requested second communication, from the first user device, the second communication being directed to a third user device, associated with the second telecommunications network, the third device being included in the set of devices for which the capability information was received;

identify, based on the received capability information, callee capability information associated with the third user device;

compare the callee capability information, associated with the third user device, to a set of parameters associated with the requested second communication;

determine, based on the comparing of the callee compatibility information associated with the third user device to the set of parameters associated with the second communication, that a subscription, associated with the third user device, does not support the requested second communication; and wherein when executing the processor-executable instructions, to handle the communication request, further causes the processor to:

output an error alert, indicating that the second communication was not successfully established.

10. The system of claim 8, wherein when executing the processor-executable instructions, to identify the callee capability information, associated with the second user device, further causes the processor to:

request the callee capability information from a server device that stores information regarding subscribers associated with a plurality of telecommunications service providers.

11. The system of claim 10, wherein the server device, that stores information regarding subscribers associated with a plurality of telecommunications service providers, is locally maintained as part of the first telecommunications network.

12. The system of claim 8, wherein the set of parameters, associated with the requested communication, includes parameters regarding at least one of:

a set of audio codecs associated with the requested communication, a set of video codecs associated with the requested communication, an identification of an application associated with the requested communication, a type of the requested communication, or an identification of a service associated with the requested communication.

13. The system of claim 8, wherein the callee capability information, associated with the second user device, includes information regarding at least one of:
a set of audio codecs supported by the second user device,
a set of video codecs supported by the user device,
a set of applications associated with the second user device,
a set of types of communications associated with a subscriber, associated with the second user device, or
an identification of a set of services associated with the subscriber, associated with the second user device.

14. The system of claim 8, wherein executing the processor-executable instructions, to transcode the communication, further causes the processor to:
receive the communication from the first user device, the communication including a first codec; and
modify the communication, the modified communication including the second codec,
wherein executing the processor-executable instructions further causes the processor to:
output the modified communication to the second user device.

15. A method, comprising:
establishing, by one or more devices associated with a first telecommunications network, a communication between a first user device and a second user device,
the first user device being subscribed to wireless service from a first service provider associated with the first telecommunications network,
the second user device being subscribed to wireless service from a second service provider associated with a second telecommunications network,
the first service provider being different than the second service provider, the establishing including:
determining capability information, associated with the second user device, without performing signaling relating to requesting the capability information from the second telecommunications network, the determining further being performed based on information, previously provided by the second telecommunications network to a server device external to the second telecommunications network and accessible to the first telecommunications network,
wherein the information, previously provided by the second telecommunications network, includes information, specific to each of a plurality of user devices associated with the second telecommunications network, that indicates a set of audio or video codecs supported by each particular user device, of the plurality of user devices associated with the second telecommunications network,
the capability information for each particular user device, of the plurality of user devices, further specifying one or more hardware characteristics of the each particular user device, the one or more hardware characteristics including at least one of:
a screen size of the each particular user device,
a screen resolution of the each particular user device, or
a quantity of audio channels supported by the each particular user device,
wherein the plurality of user devices includes the second user device,
wherein the determining, without performing the signaling relating to requesting the capability information from the second telecommunications network, results in reduced signaling relating to determining the capability information of the second user device.

16. The method of claim 15, wherein the establishing further includes:
establishing the communication based on the determined capability information.

17. The method of claim 16, wherein establishing the communication based on the determined capability information includes transcoding the communication from a first set of codecs to a second set of codecs, the second set of codecs being determined based on the capability information associated with the second user device.

18. The method of claim 15, further comprising:
requesting the capability information, associated with the second user device, from a storage device that is external to the second telecommunications network.

19. The method of claim 18, wherein the storage device is a local cache associated with the first telecommunications network.

20. The method of claim 18, wherein the storage device is a local cache associated with a third service provider that is different from the first service provider and the second service provider.

\* \* \* \* \*